(12) United States Patent
Sågfors et al.

(10) Patent No.: US 8,467,822 B2
(45) Date of Patent: Jun. 18, 2013

(54) METHOD OF TRANSMITTING DATA BLOCK INFORMATION IN A CELLULAR RADIO SYSTEM

(75) Inventors: Mäts Sågfors, Kyrkslätt (FI); Anna Larmo, Helsinki (FI)

(73) Assignee: Unwired Planet, LLC, Reno, NV (US)

( * ) Notice: Subject to any disclaimer, the term of this patent is extended or adjusted under 35 U.S.C. 154(b) by 410 days.

(21) Appl. No.: 12/811,406

(22) PCT Filed: Dec. 15, 2008

(86) PCT No.: PCT/SE2008/051461
§ 371 (c)(1),
(2), (4) Date: Jul. 1, 2010

(87) PCT Pub. No.: WO2009/088345
PCT Pub. Date: Jul. 16, 2009

(65) Prior Publication Data
US 2010/0279634 A1    Nov. 4, 2010

Related U.S. Application Data

(60) Provisional application No. 61/020,496, filed on Jan. 11, 2008.

(51) Int. Cl.
*H04W 52/24* (2009.01)
(52) U.S. Cl.
USPC ............ 455/522; 455/13.4; 455/69; 370/349; 370/318

(58) Field of Classification Search
USPC .................. 455/127.1, 69, 522, 67.11, 432.3, 455/509, 115.1, 13.4; 370/329, 336, 347, 370/342, 528, 537, 465, 310, 328, 348, 349, 370/318, 320
See application file for complete search history.

(56) References Cited

U.S. PATENT DOCUMENTS

| | | | |
|---|---|---|---|
| 7,113,496 B2* | 9/2006 | Koo et al. | 370/335 |
| 8,014,365 B2* | 9/2011 | Sebire | 370/337 |
| 8,189,615 B2* | 5/2012 | Malkamaki et al. | 370/465 |
| 2003/0185193 A1* | 10/2003 | Choi et al. | 370/348 |
| 2004/0102205 A1* | 5/2004 | Zhang et al. | 455/522 |
| 2004/0228315 A1* | 11/2004 | Malkamaki | 370/342 |
| 2005/0043052 A1* | 2/2005 | Whinnett et al. | 455/522 |
| 2005/0113127 A1* | 5/2005 | Zhang et al. | 455/522 |
| 2005/0136919 A1* | 6/2005 | Park et al. | 455/432.3 |

(Continued)

FOREIGN PATENT DOCUMENTS

| | | |
|---|---|---|
| WO | WO 01/52467 A1 | 7/2001 |
| WO | WO 2006/051372 A1 | 5/2006 |

OTHER PUBLICATIONS

International Preliminary Report on Patentability, PCT International Application No. PCT/SE2008/051461, Mar. 22, 2010.

(Continued)

*Primary Examiner* — Tan Trinh
(74) *Attorney, Agent, or Firm* — Nixon & Vanderhye P.C.

(57) ABSTRACT

A method in a transmitter for transmitting a transport format indication from a transmitter to a receiver (505) where each value of the transport format indication identifies at least two transport block sizes. Hereby a more flexible use of different transport block sizes is enabled.

15 Claims, 3 Drawing Sheets

U.S. PATENT DOCUMENTS

| | | | | |
|---|---|---|---|---|
| 2006/0040698 | A1* | 2/2006 | Shiu et al. | 455/522 |
| 2006/0143444 | A1* | 6/2006 | Malkamaki et al. | 713/160 |
| 2007/0177569 | A1* | 8/2007 | Lundby | 370/349 |
| 2007/0258413 | A1* | 11/2007 | Sebire | 370/337 |
| 2008/0225781 | A1 | 9/2008 | Wang et al. | |
| 2008/0225782 | A1* | 9/2008 | Wang et al. | 370/329 |
| 2012/0207117 | A1* | 8/2012 | Malkamaki et al. | 370/329 |

OTHER PUBLICATIONS

International Search Report, PCT International Application No. PCT/SE2008/051461, Aug. 31, 2009.

Motorola: "Transport Block Size and MCS Signaling for E-UTRA" 3GPP Draft; R1-074006-TBS & MCS Signaling, $3^{RD}$ Generation Partnership Project (3GPP), Mobile Competence Centre; 650, Route des Lucioles; F-06921 Sophia-Antipolis Cedex; France, vol. RAN WG1, No. Shanghai, China, 20071008, Oct. 8, 2007.

Panasonic: "Transport format signaling and padding overhead" 3GPP Draft; R1-074400, $3^{RD}$ Generation Partnership Project (3GPP), Mobile Competence Centre; 650, Route des Lucioles; F-06921 Sophia-Antipolis Cedex; France, vol. RAN WG1, No. Shanghai, China; 20071008, Oct. 2, 2007.

Written Opinion of the International Searching Authority, PCT International Application No. PCT/SE2008/051461, Aug. 31, 2009.

* cited by examiner

METHOD OF TRANSMITTING DATA BLOCK INFORMATION IN A CELLULAR RADIO SYSTEM

CROSS REFERENCE TO RELATED APPLICATIONS

This application is a 35 U.S.C. §371 national stage application of PCT International Application No. PCT/SE2008/051461, filed on 15 Dec. 2008, which itself claims priority to U.S. provisional patent Application No. 61/020,496, filed 11 Jan. 2008, the disclosure and content of both of which are incorporated by reference herein in its entirety. The above-referenced PCT International Application was published in the English language as International Publication No. WO 2009/088345 A1 on 16 Jul. 2009.

TECHNICAL FIELD

The present invention relates to a method and a device for transmitting data block information in a cellular radio system.

BACKGROUND

In wireless access networks such as UMTS Terrestrial Radio Access Network (UTRAN) and Evolved (E-UTRAN), the amount of data transmitted in a Transmission Time Interval (TTI) may vary considerably. This variation can depend on aspects such as transmitter buffer status, link quality, and scheduling strategy.

The amount of data transmitted in a TTI is typically reflected by the size of a Transport Block (TB), Transport Format (TF), Transport Format Combination (TFC), or a similar attribute. This "block" defines how many information bits that are transmitted in a TTI.

Typically, the transmitter performs the transport format selection, and indicates the selected transport format through out-band signaling. This is the case in UTRAN where in the following applies:
Downlink: The High-Speed Downlink Shared Channel (HS-DSCH) downlink Transport Format is derived from the Transport Format Resource Indicator (TFRI) carried on the High Speed Shared Control Channel (HS-SCCH) channel,
Uplink: The Enhanced Dedicated Channel (E-DCH) uplink Transport Format is indicated out-band with the E-DCH Transport Format Combination Indicator (E-TFCI) on the Enhanced Dedicated Physical Control Channel (E-DPCCH) channel.
This is described in e.g. 3GPP standard 25.321.
Alternatively, the receiver may select the Transport Format. This is the case in the Long Term Evolution (LTE) uplink, where the evolved NodeB (eNB) selects the transport format that the User Equipment (UE) shall use. In this case, the indication goes from the receiver to the transmitter on the Physical Downlink Control Channel (PDCCH) channel prior to the transmission of the data-block. Note that in LTE (E-UTRAN), the transport format selection is made by the eNB for both uplink and downlink transmissions.

A third alternative is denoted blind detection which is the mechanism when no format indication is transmitted in parallel or prior to the data transmission. To find the correct transport format, the receiver needs to blindly decode multiple formats. To reduce the computational complexity, the applicable formats are often reduced to a few. One benefit of blind decoding without transport format indications is that out-band signaling can be reduced. This solution is available e.g. for UTRAN downlink "HS-SCCH-less transmission".

UTRAN System

Rel-6 of the Enhanced Uplink concept (Enhanced uplink), E-UL, of E-DCH, where E-DCH stands for the Enhanced Dedicated Transport Channel) supports peak bit-rates up to 5.7 Mbps. Rel-7 has recently been updated with higher order modulation (16 Quadrature Amplitude Modulation, QAM) providing peak-rates beyond 10 Mbps.

The E-TFCI indication is carried by 7 bits on the E-DPCCH. This means that out-band signaling can indicate 128 different Transport Block sizes. Normative tables for E-TFCI values and corresponding Transport Block sizes can be found in Annex B of 3GPP standard 25.321. The most recent release (Rel-7) of the Media Access Control (MAC) specification has been updated with several new tables to support higher peak data rates and to minimize the amount of padding:

The quantization of available Transport Block (TB) sizes (128 for E-DCH) implies that not all different TB sizes are available. This means that, unless there is a perfect match of the buffer size and/or size of higher layer Packet Data Units (PDUs), padding has to be used to fill the remaining bits of the TB. If the E-TFCI has to span a large range of sizes starting from small E-DCH Transport Format Combinations (E-TFCs) (resulting in only a couple of kbps) up to large E-TFCs (resulting in several Mbps), it means that the step-sizes in the table have to be quite large. The support of higher bit-rates will increase the amount of padding, since the number of E-TFCI:s that need to span the whole operating region remain the same.

The Rel-7 MAC specification (25.321) supports several E-TFCI tables. Some of the tables have been optimized to minimize padding for the most common (fixed) Radio Link Control (RLC) Packet Data Unit (PDU) size (336 bits), while other tables have been optimized to minimize the padding with respect to other criteria. For example other tables can be optimized for the relative amount of padding for arbitrary size upper-layer payload, or inclusion of in-band signaling messages such as the Scheduling Information message.

E-UTRAN System

The E-UTRAN supports an out-band control channel, PDCCH, upon which both Uplink (UL) and Downlink (DL) transport formats will be indicated. One major difference to UTRAN concerns the uplink: in E-UTRAN it is the eNB that selects the transport format also for the uplink. Thus, the User Equipment (UE) will have to obey the format selection indicated on the PDCCH.

Furthermore scheduling may be performed by "Persistent Scheduling" or "Semi-Persistent Scheduling". With (semi) persistent scheduling, the desire is to reduce the amount of traffic on the PDCCH control channel by issuing grants that have a validity spanning over several TTIs. These multiple TTIs for which the persistent grant is valid could occur periodically, e.g. every 20 ms. Such a solution can be particularly useful e.g. for Voice over IP (VoIP) traffic. Alternatively, a persistent grant can span several consecutive TTIs.

There are different proposed solutions for control of persistent and semi-persistent grants. One solution is to use a dedicated information bit on PDCCH to indicate if a grant is persistent or not. However, this solution can be considered quite costly, as the bit would be reserved also when no persistent scheduling is used, see R2-080088, "Configuration of semi-persistent scheduling". Source: Ericsson.

Since persistent scheduling is considered as an add-on to regular scheduling, this approach is quite costly. Alternative solutions include control using inband mechanisms by Media Access Control (MAC) or Radio Resource Control (RRC). However, these upper-layer methods are subject to delays, as the MAC control elements or RRC control signals are subject to Hybrid Automatic-Repeat-Request (HARQ) (re-)transmissions.

Yet another E-UTRAN concept is denoted "HARQ Autonomous Retransmissions", or "TTI Bundling", see R2-072630, "HARQ operation in case of UL power limitation", Source: Ericsson. In this TTI Bundling concept, several HARQ re-transmissions of the same payload is issued in consecutive TTIs without waiting for HARQ feedback from the receiver. The desire with this concept is to improve coverage without introducing excessive HARQ re-transmission delays in cases when many HARQ re-transmissions are needed to achieve successful receiver decoding of a Transport Block.

As for the persistent scheduling, the TTI Bundling solution is associated with a control problem. Hence, there is a need for a solution to indicate if a transmission is a regular scheduled transmission, or if re-transmissions of the Transport Block should be issued in subsequent TTIs without waiting for HARQ feedback.

High costs in terms of radio resources of PDCCH hinder solutions where a feature, here exemplified by Persistent Scheduling and TTI Bundling, occupies dedicated bits on the PDCCH. Therefore, there is a need for a cost efficient solution to control such features which occupies dedicated bits on the PDCCH in E-UTRAN.

Several problems exist. For UTRAN, the uplink in UTRAN Rel-8 is currently being updated with Improved Layer 2 (L2) including Flexible RLC PDUs and MAC segmentation. It has recently been identified that the Transport Format tables available in MAC Rel-7 may not be optimal. With Flexible RLC PDUs, where RLC PDUs can take any suitable size, it has been identified that new E-DCH transport block sizes would be desirable. In particular, at least one new or modified small transport block is needed to improve coverage and to reduce padding. A problem is that in most cases, all (128) E-TFCI indications in the MAC E-TFCI tables are occupied. If new formats are introduced, or if Transport Format mapping to E-TFCIs are changed, then it is necessary to introduce new E-TFCI tables for Rel-8, in order to maintain backwards compatibility. As a consequence, Rel-7 already includes several E-TFCI tables, and more may be added.

It can be noted that in Rel-99, the Transport Format Combinations are configured using upper layer signaling including Radio Resource Control (RRC), Node B Application Part (NBAP) and Radio Network Subsystem Application Part (RNSAP). However, this leads to costly signaling, and for HS-DSCH and E-DCH this solution is not possible to implement in practice due to the fact that the vast amount of Transport Formats (E-TFCIs and (HS-TFRIs) are needed both in the UE and in the Node B. Therefore, the solution with tables specified in MAC was adopted, and upper layer signaling only indicates which table that should be used.

Another problem that relates both to UTRAN and E-UTRAN is that different applications, such as Multi Media Telephony (MMTel) including Voice over Internet Protocol (VoIP) can have very specific packet size distributions. This is for example the case for particular voice encoders that mainly generate packets of a few discrete sizes. Different encoders result in different (but known) packet-size distributions.

To minimize padding, it would be desirable to tailor the transport formats such that the Transport Blocks available would suit the most frequently used application packets. However, it is not practical to introduce new E-TFCI tables for every new application or codec. As new applications (with new packet-size distributions) are introduced in the future, it would be desirable to have flexibility in MAC, such that the most suitable Transport Formats could be introduced without specifying new (E-TFCI) tables in the MAC specifications. This would be particularly attractive in Rel-8 when RLC supports flexible sizes both in uplink and downlink.

In addition, as described above, the Rel-7 MAC specification has recently been updated with new E-TFCI tables to support peak rates beyond 10 Mbps. Since the number of E-TFCI bits has not been expanded in Rel-7, it means that the quantization in the new tables is less flexible than the older tables, because the available E-TFCI code-points have to span a larger space. This means that the amount of padding will increase in Rel-7.

Yet another problem which relates to E-UTRAN is that, as is already described above, there is a need for a cost-efficient solution for indicating if a grant issued and signaled on PDCCH is valid only for a single TTI (regular scheduling), or if the validity of the grant is Persistent, i.e. if the validity of the grant spans over several TTIs. Persistent scheduling where the grant is valid periodically is shown in FIG. 1.

An additional problem that is related to E-UTRAN systems is that, as is already described above, there is a need for a cost-efficient solution for indicating if a grant issued and signaled on PDCCH is valid only for a single TTI (regular scheduling), or if the grant is a grant for "Bundled TTIs", (Autonomous Re-transmissions), where the transmitter should issue HARQ re-transmissions without waiting for HARQ feedback. Typically, these autonomous re-transmissions would be issued in subsequent TTIs, see FIG. 2.

The E-TFCI indication is carried by 7 bits on the E-DPCCH. This means that that the out-band signaling can indicate 128 different Transport Block sizes. Normative tables for E-TFCI values and corresponding Transport Block sizes can be found in Annex B of 25.321. The data transmission (i.e. the actual Transport Block) is transmitted on the E-DPDCH channel(s). The transmission power of the E-DPDCH is set with a power offset relative to DPCCH (see 25.214 for details), where DPCCH is power-controlled (through fast power control) from the Node B. Each Transport Format is thus associated with a specific power offset, such that a large E-TFC is transmitted with higher power compared to smaller E-TFCs. As a tool for Quality of Service (QoS) differentiation, it is further possible to have specific offsets for different MAC-d flows, such that the offset is different for an E-TFC depending on what payload it carries. The power offsets for E-DPDCH and E-DPCCH relative to DPCCH are schematically illustrated in 3. The DPCCH is power controlled by the Node B such that it is received at the Node B with a certain Signal-to-Interference Ratio (SIR). E-DPCCH is sent with a power offset relative to DPCCH. This is also the case for E-DPDCH, but the actual offset depends on the choice of transport format and the HARQ profile used for the transmission, see also the 3GPP standard 25.321. A large format is typically sent with a large offset, while a small format is sent with a small offset.

The Rel-7 MAC specification has recently been updated with new E-TFCI tables to support peak rates beyond 10 Mbps. Since the number of E-TFCI bits has not been expanded in Rel-7, it means that the quantization in the new tables is larger than the older tables, because the available E-TFCI code-points have to span a larger space. This means that the amount of padding is likely to increase when these new tables are taken into use. As a result from this Rel-7 terminals will be less efficient in this respect, since more padding will be transmitted on average.

A solution to this padding problem could be to expand the number out-band bits carrying E-TFCI on E-DPCCH. However, this approach introduces additional out-band overhead. There are also limited means to expand the number of bits used for E-TFCI without a considerable change of the E-DPCCH physical channel.

With increasing bit-rates, it would therefore be desirable to find a method that avoids excessive padding together with a low overhead on the out-band signaling, i.e. that only a few bits for TFC indications are used.

Hence, there exist a need for a method and a system that is able to improve existing transmission schemes for cellular radio systems and which enable more efficient transmission of transport blocks.

SUMMARY

It is an object of the present invention to overcome or at least reduce some of the problems described above.

It is another object of the present invention to provide a method and a device that is capable of improving existing cellular telecommunications systems.

At least one of the above objects is obtained by the method and node as set out in the appended claims.

Thus, a method is provided where a transmitter transmits a transport format indication from the transmitter to a receiver comprising a transport format indication where each value of the transport format indication identifies at least two transport block sizes. Hereby a more flexible use of different transport block sizes is enabled.

In accordance with one embodiment the format selection is performed by the transmitter.

In accordance with one embodiment the format indication is received from the receiver.

In accordance with one embodiment the transmitter corresponds to a User equipment. The user equipment can in one embodiment be adapted to receive the transport format from an evolved Node B.

In accordance with one embodiment two (or more) transport formats identified by the same indication are separated by a second parameter. The second parameter can for example be the power on a channel such as the E-DPDCH power.

In accordance with one embodiment a mechanism is provided that enables discrete and specific Transport Formats specified in MAC tables to be re-configured in the transmitter and receiver. The re-configuration may override the Transport Format, and corresponding Transport Format Indication specified in the MAC tables. Thus, in accordance with the present invention one indication point is set to identify at least two transport Format Combinations. In accordance with one embodiment E-TFCI indications are re-used, such that one E-TFCI code point identifies multiple E-TFCs. The key idea is to ensure that the space between E-TFCs indicated by the same E-TFCI is sufficiently large, such that the receiver easily identifies the correct E-TFC from the power offset used for the E-DPDCH transmission.

In accordance with one embodiment a re-configuration may override discrete code-points as they are defined in the MAC tables.

In a second, alternative, embodiment, the MAC specification may be updated, such that each (one or several) Transport Format Indicator values (E-TFCI or TFRI code-points in UTRAN) may identify several different Transport Formats. In accordance with the second embodiment, the network may configure or indicate which of the Transport Formats indicated by the common Transport Format Indicator value that should be used.

In yet another embodiment, the transmitter may use one or several Transport Formats with common Transport Format Indication values. In this case, the receiver will have to blindly decode the received signal to identify the correct transport block.

In accordance with one embodiment, the signaling is performed with the RRC protocol. In UTRAN, the solution will also affect the NBAP and RNSAP protocols by which the E-TFCIs and HS TFRIs in the Node B are configured by the SRNC.

In order to combat problems relating to Persistent scheduling and bundling multiple ways to interpret one or several of the bits or code points reserved for Transport Format Indications on PDCCH is provided. Hereby single code points in the TF indication may identify several different ways of scheduling. To avoid ambiguity, only a single way of interpreting such code-points with multiple meanings is valid at a time, where the currently applicable interpretation is controlled by upper layers, which in one embodiment may be RRC.

In accordance with one embodiment the most significant bits of the TF indication are re-used on PDCCH to indicate if a scheduled transmission is persistent or not, where the actual transport format of persistent scheduling is indicated by the bits excluding the most significant bit, where the currently applicable interpretation of the most significant bit, i.e. if it belongs to the TF indication, or if it controls persistent/non-persistent on the TF indication is controlled by upper layers.

In accordance with another embodiment multiple meanings are defined for a set of code-points in the TF indications, where the set of code-points with multiple meanings include A regular scheduled transmission of a Transport Block with size A, A bundled scheduling of a Transport Block with size B, Where the method of how currently interpret the code-points with multiple meanings is controlled by upper layers, such that no ambiguity remains concerning the current interpretation of the indication.

In accordance with one embodiment of the present invention E-TFCI indications are re-cycled, such that one E-TFCI code point identifies multiple E-TFCs. Thus by ensuring that the space between E-TFCs indicated by the same E-TFCI is sufficiently large, such that the receiver easily identifies the correct E-TFC from the power offset used for the E-DPDCH transmission the receiver can uniquely determine the E-TFC.

In theory, this will result in that the receiver may need to perform blind detection among two or several possible E-TFC indicated by a received E-TFCI. In practice, however, the E-TFCs indicated by a common E-TFCI are sufficiently spaced apart in the E-DPDCH power-domain. Hence, the receiver can easily identify which E-TFC transmission on E-DPDCH that is accompanied with the received E-TFCI indication on E-DPCCH. Also, two or several TFCs per E-TFCI apply only at high bit-rates, when the Serving Grant spans over a first set of E-TFCI:s.

Thus, each value of the transport format indication is enabled to identify multiple transport block sizes. This can be obtained by letting different TBs identified by the same indication differ substantially, where this difference is another second parameter different from the transport format indication. The detection of the applicable format in the receiver is then set to also take into account the second parameter. In the E-DCH-case, this second parameter can be the detected E-DPDCH power.

The invention also extends to nodes and user equipment configured and operated in accordance with the above methods.

BRIEF DESCRIPTION OF THE DRAWINGS

The present invention will now be described in more detail by way of non-limiting examples and with reference to the accompanying drawings, in which.

DETAILED DESCRIPTION

Figure 1:
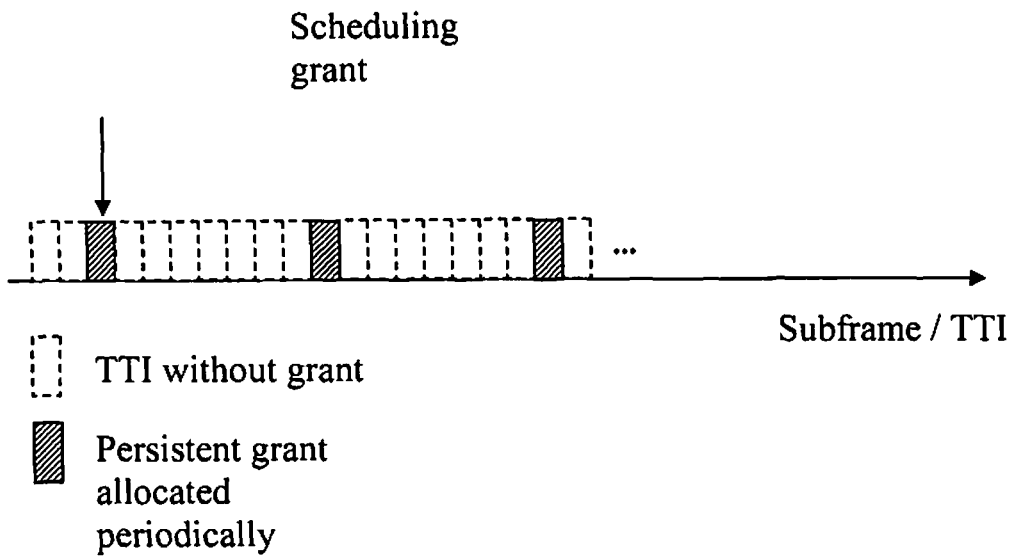
FIG. 1 is a first view illustrating scheduling.
Figure 2:
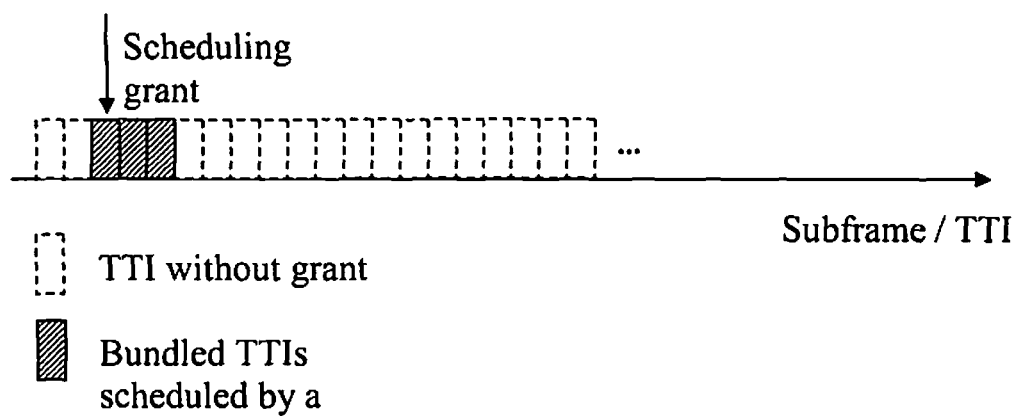
FIG. 2 is a second view illustrating scheduling.
Figure 3:
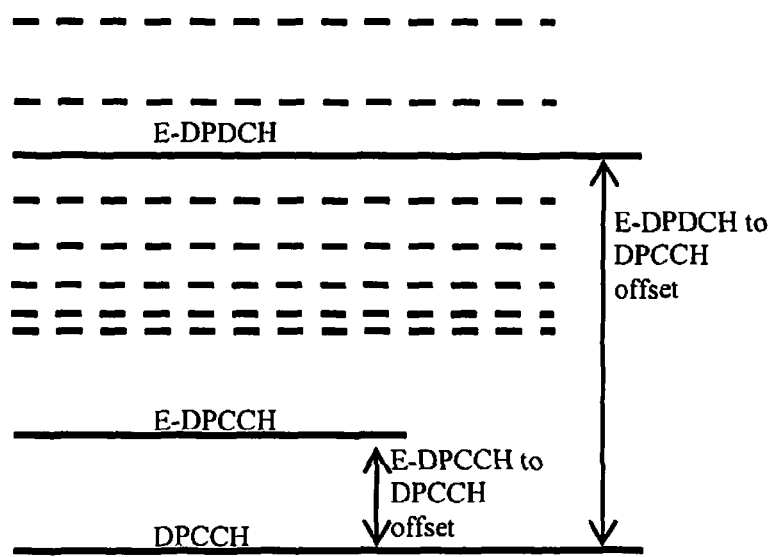
FIG. 3 is a first view illustrating transmission power offset.
Figure 4:
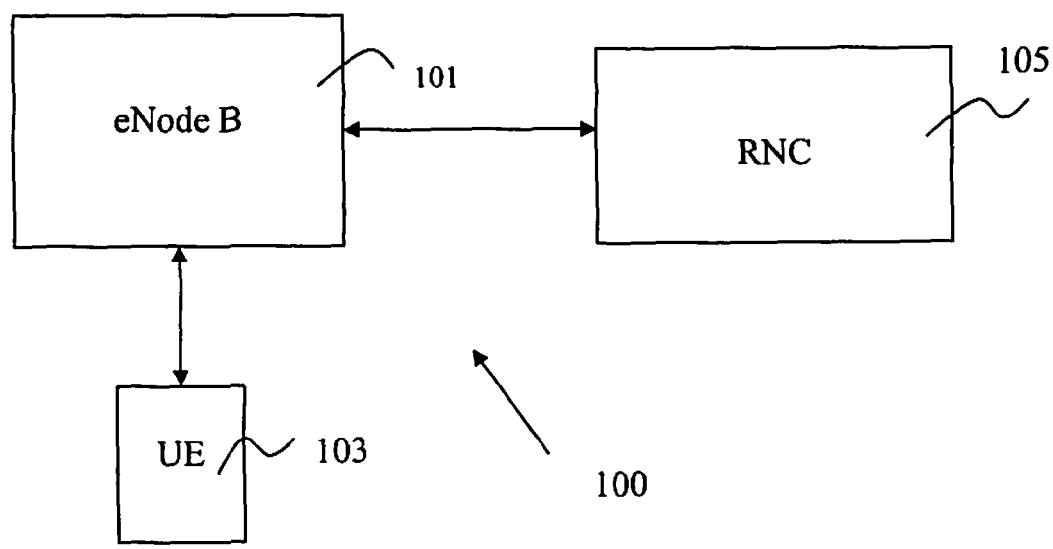
FIG. 4 is a general view of a cellular radio system.

In FIG. 4, a general view of a cellular radio system 100 is depicted. The system 100 comprises a base station (Node B) 101. The base station 101 serves a number of mobile terminals, usually termed User Equipment (UE) 103, located within the area covered by the base station 101. The base station 101 and a number of adjacent base stations (not shown) are further connected to a radio network controller node (RNC) 105.

The radio base station (101) can be adapted to control the selection of transport format by transmission of a transport format indicator to the User Equipment.

For illustrative purposes, E-DCH is here used as a non-limiting example. The same idea is however applicable to other channels. Assume that the E-TFCI would be three (3) bits long (in reality it is seven). Using existing technologies, the following E-TFCI table may be used (cf. MAC, Annex B—the present table is a truncated version of B.2 2 ms TTI E-DCH Transport Block Size Table 1):

| E-TFCI | TB Size (bits) |
|---|---|
| 0 | 18 |
| 1 | 186 |
| 2 | 204 |
| 3 | 354 |
| 4 | 372 |
| 5 | 522 |
| 6 | 540 |
| 7 | 558 |

Assume further that a new transport format with the size of 100 bits is to be introduced. In accordance with existing technology, there is now a need to re-define a new E-TFCI table, such that one several of the elements in the table are changed. For simplicity, only E-TFCI 1 (001) is redefined here in a new table.

| E-TFCI | TB Size (bits) |
|---|---|
| 0 | 18 |
| 1 | 100 |
| 2 | 204 |
| 3 | 354 |
| 4 | 372 |
| 5 | 522 |
| 6 | 540 |
| 7 | 558 |

The drawback of this approach is that the TB sizes are again fixed to new and static values. For every new need to change the TB-size, there is a need to alter the normative specifications. This approach result in a very long time-to-market, and it is difficult to predict what TB sizes are most optimal for future applications.

However, in accordance with the present invention, there is no need to re-define new tables, but the original table is used as a basis, and only discrete code-points of the E-TFCI indications are overridden by higher-layer signaling. In the example, RRC would configure the UE to use the original table above, but re-define E-TFCI [001] to the size 100 bits.

Figure 5:
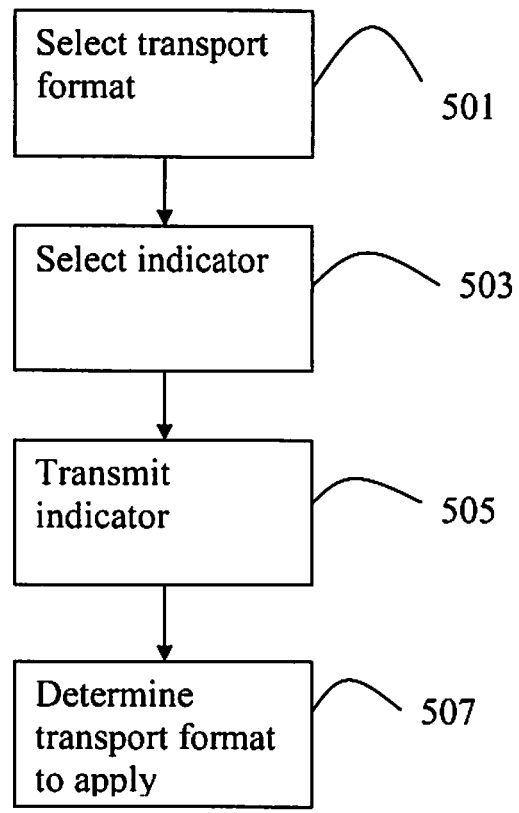
FIG. 5 is a flow chart illustrating steps performed when transmitting transport format indication.

In FIG. 5 a flow chart illustrating procedural steps performed when transmitting a transport format indicator from a user equipment to a radio base station is shown. First, in a step 501 a transport format is selected. Next, in a step 503 an indicator indicating this format is selected where the indicator corresponds to at least two transport formats. The indicator is then transmitted to the radio base station in a step 505. The radio base station then determines the transport format based on the received indicator and some other information in a step 507. For example the other information can be a blind-detection algorithm or a second parameter such as a power level on a channel or any other information as described herein.

A particular benefit of this approach is that the E-TFCI tables in the UE and NodeB:s can be optimized and tailored for specific packet distributions to minimize padding. This is true also for future applications like new MMTel encoders.

Alternatively, the MAC specification could be updated, such that one or several E-TFCIs indicate multiple Transport Block sizes, and upper layers control which of the alternatives should currently be in use.

Alternatively, the MAC specification could be updated, such that one or several E-TFCIs indicate multiple Transport Block sizes, such that the receiver blindly decodes to identify which of the possible Transport Blocks that has been transmitted within the set of possible Transport Blocks as indicated by the E-TFCI.

In accordance with another exemplary embodiment, assume that four bits are allocated on PDCCH for indicating the Transport Format size (both uplink and downlink). Note that the number of bits for TF indication remains undecided in 3GPP. With four bits, it is possible to indicate 16 different transport formats.

Assume now that it is desired to indicate if a scheduled transmission is persistent or not. If this is to be indicated on PDCCH and have the persistent scheduling available for all Transport Formats, then yet another bit on PDCCH has to be introduced to indicate if the scheduled transmission is persistent or not.

However, in accordance with the present invention, some code points can be set to indicate that the scheduling grant is persistent, e.g. that it is valid periodically with a period previously configured by higher layers (preferably RRC).

As an example, let the code points with the most significant bit of the TF indication set to "1" have multiple meanings:

If configured by upper layers, the most significant bit of the TF indication is used in a "regular" fashion, such that 16 different formats are available.

| Code Point | TB Size (bits) |
|---|---|
| 0000 | A |
| 0001 | B |
| 0010 | C |
| 0011 | D |
| 0100 | E |
| 0101 | F |
| 0110 | G |
| 0111 | H |
| 1000 | I |
| 1001 | J |
| 1010 | K |
| 1011 | L |
| 1100 | M |
| 1101 | N |
| 1110 | O |
| 1111 | P |

Alternatively, the most significant bit could indicate that the scheduling is persistent, as illustrated below:

| Code Point | TB Size (bits) | |
|---|---|---|
| 0000 | A' | Non-persistent |
| 0001 | B' | " |
| 0010 | C' | " |
| 0011 | D' | " |
| 0100 | E' | " |
| 0101 | F' | " |
| 0110 | G' | " |
| 0111 | H' | " |
| 1000 | A' | Persistent |
| 1001 | B' | " |
| 1010 | C' | " |
| 1011 | D' | " |
| 1100 | E' | " |
| 1101 | F' | " |
| 1110 | G' | " |
| 1111 | H' | " |

In the latter case, there are only 8 different formats available, but the eNB can take all 16 formats into use by simply disabling the possibility to use persistent scheduling.

Switching between these two modes could be controlled by RRC, such that the UE and eNB peers would un-ambiguously know if e.g. the code point "1101" indicates a non-persistent scheduling of TB "N", or a persistent scheduling of TB "F'". This method can provide a more flexible and more efficient means to use the code points.

In one embodiment, the actual TB size, when persistent scheduling is used, is then interpreted from the remaining least significant bits. Alternatively, different sets of tables for persistent and non-persistent scheduling could be specified as exemplified above.

Similarly higher layer signaling could be used to configure the interpretation of some code points such that these code points indicate that a grant is valid for several TTIs. For the case where the grant is valid for several TTIs the higher layer could optionally also indicate how these TTIs should be used, i.e.

a) These TTIs are used for transmission of different payload (MAC PDUs) in each TTI (the same behavior as if one normal grant would have been sent for each TTI). In this case HARQ feedback is sent by the UE after each TTI, or;
b) These TTIs are used for transmission of the same payload (MAC PDU) in each TTI, potentially with different physical layer coding (e.g. HARQ redundancy version) according to R2-072630, "HARQ operation in case of UL power limitation", Source: Ericsson. A UE configured in this way will not send any HARQ feedback until all the TTIs indicated in the grant have been received.

| Code Point | TB Size (bits) | |
|---|---|---|
| 0000 | A' | 1 TTI transmission |
| 0001 | B' | " |
| 0010 | C' | " |
| 0011 | D' | " |
| 0100 | E' | " |
| 0101 | F' | " |
| 0110 | G' | " |
| 0111 | H' | " |
| 1000 | I' | " |
| 1001 | J' | " |
| 1010 | K' | " |
| 1011 | L' | " |
| 1100 | A'' | 2 TTI transmission |
| 1101 | B'' | 2 TTI transmission |
| 1110 | A''' | 4 TTI transmission |
| 1111 | B''' | 4 TTI transmission |

Hereby less padding, better granularity of transport formats is obtained. Also flexibility in the configuration of transport formats, to match the formats needed by a specific application is obtained. In addition there is no need to introduce additional tables into the MAC specification for every needed update of the transport block size.

Furthermore in accordance with one embodiment of the present invention E-TFCI indications are re-cycled such that one E-TFCI code point identifies multiple E-TFCs. Thus by ensuring that the space between E-TFCs indicated by the same E-TFCI is sufficiently large, such that the receiver easily identifies the correct E-TFC from the power offset used for the E-DPDCH transmission the receiver can uniquely determine the E-TFC. For illustrative purposes, assume that the E-TFCI is three bits long. In accordance with the present invention, the following E-TFCI table can then be defined cf. MAC, Annex B:

| E-TFCI | TB Size (bits) |
|---|---|
| 0 | 18 |
| 1 | 186 |
| 2 | 204 |
| 3 | 354 |
| 4 | 372 |
| 5 | 522 |
| 6 | 540 |
| 7 | 558 |
| 0 | 674 |
| 1 | 692 |
| 2 | 708 |
| 3 | 858 |
| 4 | 876 |
| 5 | 894 |
| 6 | 1026 |
| 7 | 1044 |
| 0 | 1194 |
| 1 | 1212 |
| 2 | 1230 |
| 3 | 1330 |
| 4 | 1348 |
| 5 | 1362 |

| E-TFCI | TB Size (bits) |
|---|---|
| 6 | 1380 |
| 7 | 1530 |

In this illustration, the E-TFCI is re-used two times (i.e. each E-TFCI indicates three different formats). There are no restrictions as to the number of times an E-TFCI can be re-used. Hence it may be reused in a single re-cycling of the E-TFCI or in two or more.

Assume further that the E-TFCI on E-DPCCH has the value "2". Then, the transmission on E-DPDCH can be either of size "204", "708" or "1230". However, the TB transmission on the E-DPDCH is associated with a power offset, where the power used for "1230" is much larger compared to the power used for transmitting "708" and "204". Thus, it is possible for the receiver to detect the actual TFC guided by the received power on E-DPDCH. Thus, the "blind-detection" problem is reduced to a regular decoding problem without any iteration for decoding several formats.

Figure 6:
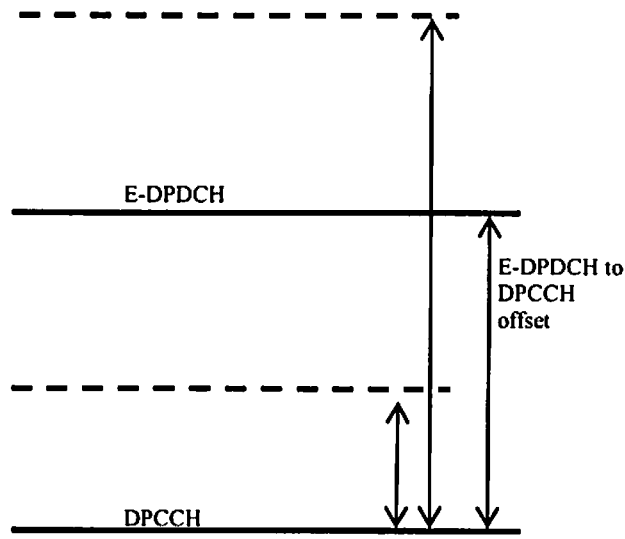
FIG. 6 is a second view illustrating transmission power offset.

This is illustrated in FIG. 6, where it is assumed that three E-TFCs are identified by the same E-TFCI code point. If the E-TFCs are sufficiently apart in the power-domain, i.e. the E_DPDCH-to-DPCCH offsets differ substantially, the blind decoding problem is reduced to a regular decoding problem in the receiver.

In particular, if the current grant is below the re-cycling level, then there is no possibility for ambiguity. For example, if the grant (in the power-domain) allows for transmitting up to 800 bits in the table above, then E-TFCI indications "0", "1" and "2" may indicate two different TB sizes, while all other indications are unambiguous.

Applying the present invention to E-DCH MAC would imply a new set of tables to Annex B, as well as a description of how to indicate the E-TFCI and how to use the tables, if configured by upper layers. In accordance with one embodiment Rel-6 tables are expanded (without touching the current E-TFCI-to-TB Size mapping), such that the new indications span the new bit-rates provided by 16QAM. This is illustrated below by expanding Table 0 of Annex B below (with the marked indications)

| E-TFCI | TB Size (bits) |
|---|---|
| 0 | 18 |
| 1 | 120 |
| 2 | 124 |
| 3 | 129 |
| 4 | 133 |
| 5 | 138 |
| 6 | 143 |
| 7 | 149 |
| 8 | 154 |
| 9 | 160 |
| 10 | 166 |
| 11 | 172 |
| 12 | 178 |
| 13 | 185 |
| 14 | 192 |
| 15 | 199 |
| 16 | 206 |
| 17 | 214 |
| 18 | 222 |
| 19 | 230 |
| 20 | 238 |
| 21 | 247 |
| 22 | 256 |
| 23 | 266 |
| 24 | 275 |
| 25 | 286 |
| 26 | 296 |
| 27 | 307 |
| 28 | 318 |
| 29 | 330 |
| 30 | 342 |
| 31 | 355 |
| 32 | 368 |
| 33 | 382 |
| 34 | 396 |
| 35 | 410 |
| 36 | 426 |
| 37 | 441 |
| 38 | 458 |
| 39 | 474 |
| 40 | 492 |
| 41 | 510 |
| 42 | 529 |
| 43 | 548 |
| 44 | 569 |
| 45 | 590 |
| 46 | 611 |
| 47 | 634 |
| 48 | 657 |
| 49 | 682 |
| 50 | 707 |
| 51 | 733 |
| 52 | 760 |
| 53 | 788 |
| 54 | 817 |
| 55 | 847 |
| 56 | 878 |
| 57 | 911 |
| 58 | 944 |
| 59 | 979 |
| 60 | 1015 |
| 61 | 1053 |
| 62 | 1091 |
| 63 | 1132 |
| 64 | 1173 |
| 65 | 1217 |
| 66 | 1262 |
| 67 | 1308 |
| 68 | 1356 |
| 69 | 1406 |
| 70 | 1458 |
| 71 | 1512 |
| 72 | 1568 |
| 73 | 1626 |
| 74 | 1685 |
| 75 | 1748 |
| 76 | 1812 |
| 77 | 1879 |
| 78 | 1948 |
| 79 | 2020 |
| 80 | 2094 |
| 81 | 2172 |
| 82 | 2252 |
| 83 | 2335 |
| 84 | 2421 |
| 85 | 2510 |
| 86 | 2603 |
| 87 | 2699 |
| 88 | 2798 |
| 89 | 2901 |
| 90 | 3008 |
| 91 | 3119 |
| 92 | 3234 |
| 93 | 3353 |
| 94 | 3477 |

-continued

| E-TFC1 | TB Size (bits) |
|---|---|
| 95 | 3605 |
| 96 | 3738 |
| 97 | 3876 |
| 98 | 4019 |
| 99 | 4167 |
| 100 | 4321 |
| 101 | 4480 |
| 102 | 4645 |
| 103 | 4816 |
| 104 | 4994 |
| 105 | 5178 |
| 106 | 5369 |
| 107 | 5567 |
| 108 | 5772 |
| 109 | 5985 |
| 110 | 6206 |
| 111 | 6435 |
| 112 | 6672 |
| 113 | 6918 |
| 114 | 7173 |
| 115 | 7437 |
| 116 | 7711 |
| 117 | 7996 |
| 118 | 8290 |
| 119 | 8596 |
| 120 | 8913 |
| 121 | 9241 |
| 122 | 9582 |
| 123 | 9935 |
| 124 | 10302 |
| 125 | 10681 |
| 126 | |
| 127 | |
| 0 | |
| 1 | |
| 2 | |
| 126 | |
| 127 | |

An advantage of this approach is that Rel-6 & Rel-7 UEs would behave identically for grants that do not allow for using higher-order modulation. At the same time, a receiver cannot mistakenly believe that the transmission of e.g. E-TFCI "0" with 12000 bits format on E-DPDCH would be interpreted as 18 bits. The power-difference of these two formats is very large indeed. I.e. the quantization of Rel-6 and 7 UEs can be the same for small TBs.

Using the method and system as described herein will provide for less padding and better granularity of transport formats. Also a smoother control of the transmission rate of a UE is achieved, since the step-sizes are smaller. It is also possible to reduce the number of E-TFCI bits.

The invention claimed is:

1. A method of operating a transmitter, the method comprising:
    transmitting a transport format indication to a receiver, wherein a value of the transport format indication indicates to the receiver at least two different transport block sizes and a transmitted power level of the value is controlled to further indicate to the receiver which of the at least two transport block sizes is to be used for communication.

2. The method according to claim 1, further comprising operating the transmitter to select the transport format indication from among a plurality of transport format indications.

3. The method according to claim 1, further comprising receiving the transport format indication at the transmitter from the receiver.

4. The method according to claim 1, wherein the transmitter is operated within a user equipment.

5. The method according to claim 3, wherein the transport format indication is received from an evolved Node B.

6. The method according to claim 1, wherein the transport format indication is transmitted through an Enhanced Dedicated Physical Data Control Channel (E-DPDCH) and the power used to transmit the value is controlled to further indicate to the receiver which of the at least two transport block sizes is to be used for communication.

7. A user-equipment comprising:
    a transmitter that is configured to transmit a transport format indication to a radio base station; and
    an electronic component that is configured to control a value of the transport format indication to indicate to the radio base station at least two different transport block sizes and to control a transmitted power level of the value to further indicate to the radio base station which of the at least two transport block sizes is to be used for communication.

8. The user equipment according to claim 7, wherein the electronic component is configured to control transmitted power level of the value through an Enhanced Dedicated Physical Data Control Channel (E-DPDCH) to indicate to the radio base station which of the at least two transport block sizes is to be used for communication.

9. The user equipment according to claim 7, wherein the electronic component is configured to control the transmitted power level of another value of the transport format indication to indicate to the radio base station whether a scheduled transmission is persistent or not.

10. The method of claim 1, further comprising controlling the transmitted power level of another value of the transport format indication to indicate to the receiver whether a scheduled transmission is persistent or not.

11. Radio equipment comprising:
    a transmitter that is configured to transmit a transport format indication via a RF communication channel; and
    an electronic component that is configured to control a value of the transport format indication to indicate to a receiver at least two different transport block sizes and to control a transmitted power level of the value to further indicate to the receiver which of the at least two transport block sizes is to be used for communication.

12. The radio equipment according to claim 11, wherein the electronic component is configured to control transmitted power level of the value through an Enhanced Dedicated Physical Data Control Channel (E-DPDCH) to indicate to the receiver which of the at least two transport block sizes is to be used for communication.

13. The radio equipment according to claim 11, wherein the electronic component is configured to control the transmitted power level of another value of the transport format indication to indicate to the receiver whether a scheduled transmission is persistent or not.

14. The method of claim 1, wherein the value of the transport format indication corresponds to a first transport block size, the method further comprising, before transmitting the transport format indication to the receiver, re-defining the value of the transport format indication to correspond to a second transport block size while maintaining the correspondence of the value of the transport format indication to the first transport block size.

15. The method of claim 14, wherein re-defining the value of the transport format indication comprises re-using the value of the transport format indication in a transport format table such that the transport format table includes both the correspondence of the value of the transport format indication to the first transport block size and the correspondence of the value of the transport format indication to the second transport block size.

* * * * *